United States Patent
Lopes

(10) Patent No.: US 10,322,884 B2
(45) Date of Patent: Jun. 18, 2019

(54) RECLAIMER CONTROL SYSTEM AND METHOD

(71) Applicant: VALE S.A., Botafogo, Rio de Janerio (BR)

(72) Inventor: Bruno Eduardo Lopes, Vitória (BR)

(73) Assignee: VALE S.A., Rio de Janeiro (BR)

( * ) Notice: Subject to any disclaimer, the term of this patent is extended or adjusted under 35 U.S.C. 154(b) by 0 days.

(21) Appl. No.: 15/887,500

(22) Filed: Feb. 2, 2018

(65) Prior Publication Data

US 2018/0222685 A1 Aug. 9, 2018

(30) Foreign Application Priority Data

Feb. 3, 2017 (BR) .............................. 102017002299

(51) Int. Cl.
| | | |
|---|---|---|
| *B65G 43/08* | (2006.01) | |
| *E02F 3/26* | (2006.01) | |
| *G05B 13/04* | (2006.01) | |
| *E02F 3/18* | (2006.01) | |
| *E02F 9/20* | (2006.01) | |

(52) U.S. Cl.
CPC .............. *B65G 43/08* (2013.01); *E02F 3/181* (2013.01); *E02F 3/26* (2013.01); *G05B 13/048* (2013.01); *E02F 9/2037* (2013.01)

(58) Field of Classification Search
CPC ........ B65G 65/16; B65G 43/00; B65G 17/12; G05B 19/04; G05B 13/048; G05B 13/0265; E02F 3/26; E02F 3/18; E02F 9/262
USPC .................................. 701/50; 198/507, 519
See application file for complete search history.

(56) References Cited

U.S. PATENT DOCUMENTS

| 4,890,719 A * | 1/1990 | Yagi ..................... B65G 65/005 198/507 |
| 8,930,091 B2 * | 1/2015 | Upcroft .................... E02F 9/26 701/50 |
| 9,073,701 B2 | 7/2015 | Lopes |
| 2005/0040015 A1* | 2/2005 | Schlegel ................ B65G 65/06 198/519 |
| 2014/0067194 A1* | 3/2014 | Gralow ..................... E02F 3/26 701/32.3 |
| 2015/0247301 A1* | 9/2015 | Wighton ................... E02F 3/18 701/50 |

FOREIGN PATENT DOCUMENTS

CN 101776867 B 5/2012

* cited by examiner

*Primary Examiner* — James R Bidwell
(74) *Attorney, Agent, or Firm* — Arent Fox LLP

(57) ABSTRACT

A system and method for automated control of reclaimers includes a boom, a bucket wheel, and a translation system. This system comprises memorizing operating parameters used during a turning movement of the boom, allowing identification of positions where there was an overflow or an unsatisfactory reclaiming flow. With this memorized information, the flow controller makes changes to the boom turning speed (Vg), increasing it in positions where the reclaiming flow was low and decreasing it in positions where there was overflow.

12 Claims, 2 Drawing Sheets

RECLAIMER CONTROL SYSTEM AND METHOD

CROSS REFERENCE TO RELATED APPLICATION

This application claims priority to BR Application No. 102017002299-4 filed Feb. 3, 2017, the disclosure of which is hereby incorporated by reference in its entirety.

FIELD OF THE INVENTION

The present invention relates to a system and method for automated control of reclaimers.

BACKGROUND OF THE INVENTION

Reclaimers are machines used to handle materials in bulk, especially ore. Such equipment is used in material storage yards, sea and river ports, and other places where it is necessary to transport large quantities of bulk material.

Reclaimers basically comprise a boom, a bucket wheel, and a translation system. The translation system comprises several trucks and wheels and is responsible for the linear movement of the machine under the rails where it is installed, allowing it to move back and forth.

The boom and the bucket wheel consist of elements responsible for reclaiming bulk material. The bucket wheel is a wheel having several buckets distributed along its radial portion.

The bucket wheel rotates so that, when it is in contact with the stack of material to be reclaimed, it is able to collect the material in its buckets and discharge it into the machine boom, thereby reclaiming it.

The boom consists of a lattice beam, configured to support the bucket wheel at its end. The other end of the boom is fixed to the machine translation system, having two rotating degrees in relation to the system, one parallel to the ground and another perpendicular to the ground.

Such degrees of freedom allow an angular movement of the bucket wheel as well as change its height to the ground. The boom is also provided with a conveyor belt along its structure, which is responsible for transporting the material that was collected by the bucket wheel.

In this way, the amount of material being reclaimed is directly proportional to the speed of rotation of the boom and the speed of rotation of the bucket wheel. In order to measure flow rate, that is, the amount of material being collected, a scale is used.

The scale is always mounted at a reasonable distance from the bucket wheel, generally at the midpoint of the boom conveyor, to avoid interference caused by impact of the material during the transition from the bucket wheel to the boom. This distance between the scale and the bucket wheel causes an average delay time of 10 to 15 seconds to the measurement made by it.

In addition to the delay time of the scale, there are also delay times associated with the acceleration and deceleration ramp of the turning mechanism inverters of the reclaimer, which normally range from 6 to 10 seconds.

Control of these speeds is made by a PID controller that takes these delay times into account and measures the flow of reclaimed material to verify the need for changes in these speeds.

In addition to the boom and bucket wheel turning speeds, there are also other factors that interfere with the material reclaiming flow and are related to the stack or bench of material being reclaimed.

The more stable the reclaiming bench, the better the PID controller response to control the boom turning mechanism speed in order to keep the reclaiming flow equal to a desired value.

However, it is not always possible to obtain this stability because several reasons may cause a sudden change in the behavior of the reclaiming bench. These changes in the bench result in changes in the volume to be reclaimed, requiring a very rapid response from the PID controller.

This rapid response of the flow controller to change the turning speeds is to avoid overflows (machine overloads, that is, a reclaiming flow greater than the recommended one) and avoid loss of productivity during the reclaiming process.

In manual operation of the reclaimer, the operator is able to preview a sudden change in the reclaiming bench and act in advance to control the boom turning speed in order to avoid the occurrence of an overflow. However, semiautomatic operation requires methods to allow the flow controller to anticipate some actions, trying to predict what may happen in the future.

This is a problem in semi-automatic operation, since bench instability may cause a certain tuning speed of the boom, which maintained a reclaiming rate equal to the desired value, to generate overflow at the moment it faces a large increase in reclaiming volume caused by bench instability.

Due to the high delay time between the bucket wheel and the scale, the state of the art reveals controls that use more immediate information so that corrections in the boom turning mechanism speed are made quickly without loss of reclaiming rate.

These corrections in the state of the art use estimated flow-based technologies that use data from hydraulic pressure or electric current of the bucket wheel motor to control the reclaiming rate. This control responds to variation of pressure or current in the bucket wheel, automatically adjusting the turning speed as needed.

However, the problem with this technique is that when this type of control faces problems arising from unstable reclaiming benches, which are mentioned above, the controller cannot deal with response time, which is delayed due to delays caused by the acceleration and deceleration ramps of the turning inverter.

Another solution found in the state of the art for the problem of delay time caused by the acceleration and deceleration ramp of the turning inverters is described in the patent document U.S. Pat. No. 9,073,701 discussed below.

The technique disclosed by the American document uses 2D sensors installed near the bucket wheel, configured to calculate the volume of material to be reclaimed by the bucket wheel. From the calculated material volume, it is possible to predict the reclaiming rate and the ideal boom turning speed for the entire bench to be reclaimed.

In this technique, the 2D sensor reading occurs in advance, that is, before detection by the pressure or current of the bucket wheel, making control of the boom turning speed faster and more efficient. When reading overflow or decrease in reclaiming rate, the PID controller receives information on the turning speed ideal for the given reading, thereby improving its response time.

However, using this technique of document U.S. Pat. No. 9,073,701 requires the acquisition of robust 2D sensors, making its cost very high. Another problem with this technique is that it cannot respond to pile collapses on the bucket wheel because the sensor reading is made only a few degrees in front of the bucket wheel.

The state of the art also includes other patent documents claiming automatic control systems for reclaimers. One such document is CN101776867B, which discloses a method of control for bucket wheel reclaimers.

This method allows to insert data experimentally or analytically obtained in a database in the machine PLC. The control measures the frequencies of the turning motors of both the bucket wheel and the reclaimer boom. With these frequencies the control can verify the stresses on these elements, the speed of their rotation, and the amount of material being reclaimed.

In addition, the control measures the location of all elements that comprise the reclaimer by means of an encoder. With this data, the control is able to measure the translation and rotation movement of its elements.

Data entered include: the geometry of the stack of material being collected; the speed appropriate for the operation in relation to the material being collected; and other information.

Thus, the reclaimer is able to calculate its position relative to the material stack and the modifications made to the material stack during reclaiming.

However, document CN101776867B only demonstrates a technique for automating a bucket wheel reclaimer by means of a solution for detecting the edges of the material stack, using data of stack generated during stacking and data of bucket wheel motor current.

In addition, the material flow is controlled by a control mesh that uses information of bucket wheel current, not being able to improve and control the flow of material based on reclaiming already made.

Thus, it is concluded that both the solution proposed above and the solutions pointed out in patent documents U.S. Pat. No. 9,073,701 and CN101776867B are unable to anticipate control actions to avoid overflows or loss of reclaiming rates.

In addition, none of the devices, systems, and methods in the state of the art are capable of improving the PID response time without using robust 2D sensors.

OBJECTS OF THE INVENTION

The present invention aims at a system for control of reclaimers capable of anticipating the control actions to avoid overflows or loss of rates.

The present invention also aims at a system for control of reclaimers capable of improving the response time of the machine PID.

Finally, the present invention also aims at a method for performing the control actions of a reclaimer.

BRIEF DESCRIPTION OF THE DRAWINGS

The present invention is detailed described based on the respective figures.

DETAILED DESCRIPTION OF THE INVENTION

Figure 1:
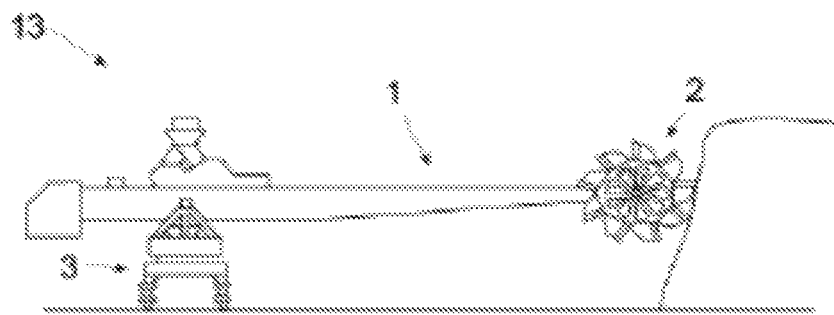
FIG. 1 is a side view of a reclaimer.
Figure 2:
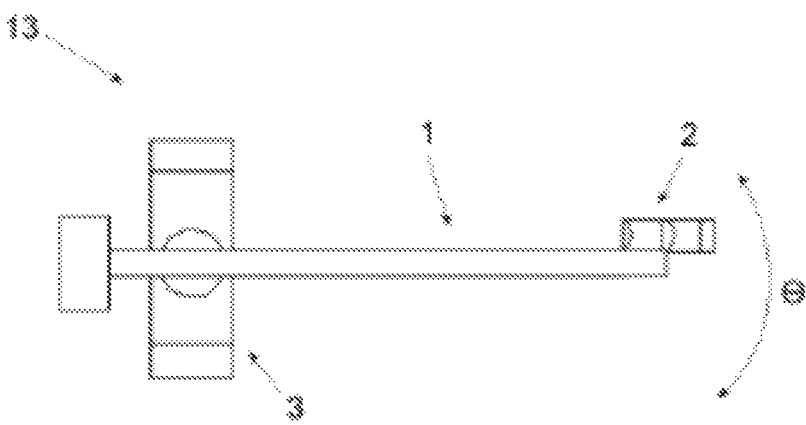
FIG. 2 is a top view of a reclaimer.

The present invention describes a semi-automatic control system for reclaimers and an operating method for these machines. These reclaimers are designed to a rated capacity for a desired reclaiming flow, allowing a variability that does not exceed the maximum capacity of the machine.

Exceedance of the maximum capacity of the machine is named overflow, that is, overflow occurs when, during the reclaiming process, the reclaiming rate exceeds the maximum capacity stipulated by the design of the machine.

The main objective of the present invention is to increase productivity of the reclaiming rate without increasing the index of overflow. The reclaiming rate is determined by the product of the density addends of the product as well as by the mass flow rate of the control volume, that is, the volume being reclaimed.

As shown by Rodenberg (1983), the theoretical mass flow rate of the reclaiming volume is determined by the product of the following addends: bench height (H); turning speed of the bucket wheel (Vr); maximum section thickness (tmax); and swelling factor (f).

In automated or semi-automatic reclaimers, operating procedure rules define the ideal bench height (H) and maximum section thickness (tmax) values. The turning speed of the bucket wheel (Vr) is kept constant during the reclaiming operation.

Thus, the mass flow rate is controlled by adjusting the boom turning speed (Vg). This speed (Vg) directly interferes with the intensity of penetration of the bucket wheel 2 in the stack and is adjusted by means of a mesh of a PID controller, named flow controller.

This flow controller mesh is intended to cause the mass flow rate of the resulting reclaiming, that is, the reclaiming flow, to be maintained close to a desired rate.

Thus, the system and method of the present invention discloses a solution that uses information about the operating parameters of the reclaimer that occurred in the past to calculate an ideal boom turning speed during its entire reclaiming movement.

Such information on the calculated ideal boom turning speed is then integrated into the PID controller in order to anticipate control actions to avoid overflow or loss of productivity, thereby improving the response time of the PID controller.

In order to calculate the ideal boom turning speeds, the PID controller memorizes important information during the boom turning movement in the reclaiming process, such as: mass flow (Vz); boom turning speed (Vg); and boom angular position (θ).

This memorized information is used to assist the flow controller in the next turning movements of the boom, thus increasing productivity and avoiding overflow in the machine.

In other words, the control system of the present invention rotates the turning mechanism of boom 1 of reclaimer 13 in one direction, clockwise or counterclockwise, and memorizes the important parameters measured and used during that movement.

This information is recorded for each angular position (θ) of boom 1, allowing to check the reclaiming rate of the machine along each angle of its path. Thus, it is possible to verify if the reclaiming rate is satisfactory or if there was overflow in each angular position (θ) of boom 1.

When the angular movement of boom 1 reaches a limit position (named reversal angle), the boom makes a reverse movement, that is, if the movement was in clockwise direction, it will now be in counterclockwise direction and vice versa.

Thus, in this reverse movement, the controller is able to determine, according to the recorded information, whether the turning speed (Vg) of boom 1 must be increased or decreased for this angular position (θ), thus maintaining a high productivity and avoiding overflow.

That is, in clockwise movement, in a certain angular position (θ) if the reclaiming rate is below the desired range, in counterclockwise movement, for the same angular position (θ), the controller increases the boom turning speed (Vg) to achieve a satisfactory mass flow rate (Vz).

Similarly, if during clockwise movement in a certain angular position (θ) the reclaiming rate is above the maximum capacity (overflow situation), in counterclockwise movement, for the same angular position (θ), the controller decreases the boom turning speed (Vg) to avoid new overflow.

Thus, with the recorded information on a given movement, for the same movement in the same direction or in reverse direction, the controller is able to always keep the reclaiming rate at a satisfactory rate, maintaining high productivity and decreasing events of overflow.

For establishing the control system described above, the present invention uses an operating method that is described in detail below.

Figure 3:
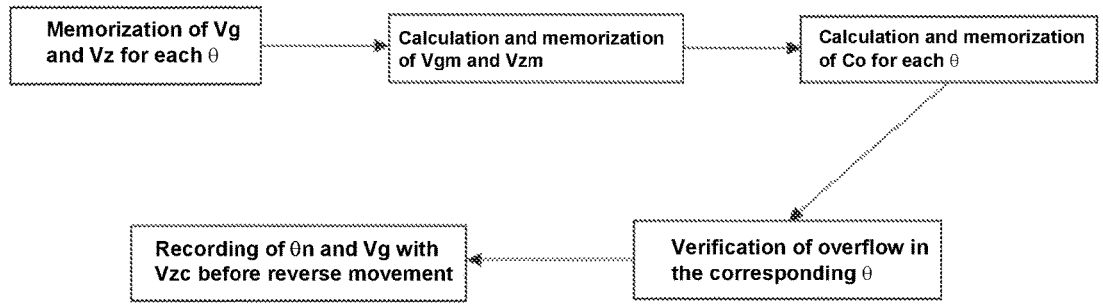
FIG. 3 shows a flowchart of the steps involved in the process of memorizing the operating parameters.
Figure 4:
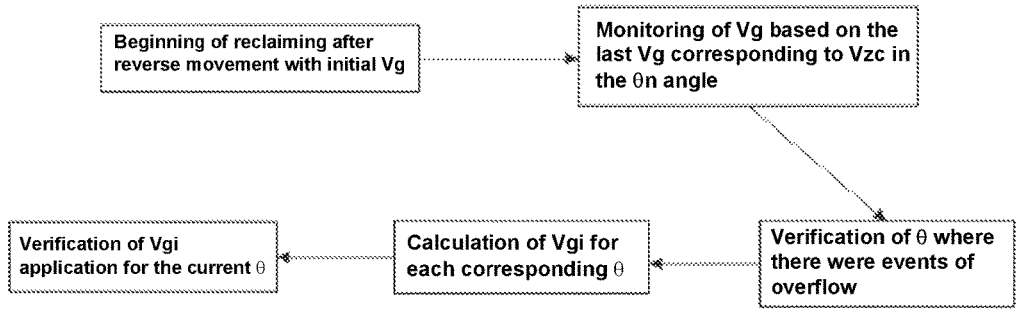
FIG. 4 shows a flowchart of the steps involved in the process of using the memorized operating parameters.

The operating method is divided into two main processes: memorization of important information during the turning movement of boom 1 and use of the memorized information, according to FIGS. 3 and 4.

The first step consists in sampling the following variables for a given time: boom turning speed (Vg) reference, reclaiming mass flow rate (Vz) corresponding to the turning speed (Vg), and angular position (θ) of boom 1.

For this purpose, the boom rotating speed (Vg) must be delayed considering the delay value of the acceleration and deceleration ramp of the turning accelerator, together with the delay time between the bucket wheel 2 and the scale, previously explained ("Background of the Invention").

The second step is configured to average the values of the boom turning speed (Vg) and flow rate (Vz) at each angular range of the angular position (θ) of boom 1. Thus, it is possible to determine an average value for the boom turning speed (Vgm) and flow rate (Vzm) for each angular range during the movement of boom 1. The angular range is parameterized according to the operation to be performed.

These average values calculated in the second step are then memorized in the vectors for each variable, that is, the average value of the boom turning speed (Vgm) is recorded in the boom turning speed vector, while the average value of the flow rate (Vzm) is recorded in the flow rate vector.

After calculation of the average flow rate (Vzm) and average boom turning speed (Vgm), the correlation (Co) between these recorded average values is made in the third step. This correlation (Co) is made for each determined angular range and recorded in a correlation vector.

The correlation (Co) of these average values consists of dividing the average value of the boom turning speed (Vgm) by the average value of the mass flow rate (Vzm), and this calculation is made for each angular range to determine the correlation (Co) at each angular position (θ) of boom 1.

In addition to the correlations (Co), in case of overflow during the turning movement of boom 1, this overflow is recorded in the fourth step. This step consists in recording the events of overflow, relating them to the angular position (θ) of boom 1.

In addition to the angular position (θ), the boom turning speed (Vg) is also recorded at the moment of the overflow, thus allowing the controller to verify both the position and the turning speed used during this event.

For this angular position (θ) to be accurate, the information recording process takes into account the delay time of both the acceleration ramp and the scale, thus ensuring that the information is precisely recorded in its correct angular position (θ).

The fifth and final step of the information recording process consists of recording the last turning angle (θn) and the turning speed at which a considered flow rate (Vzc) is obtained before turning reverse movement. Recording this information also takes into account delay times.

To determine the considered flow rate (Vzc) value, a certain percentage is established in relation to the reclaiming setpoint, that is, the maximum reclaiming rate of the project. This percentage is also parameterized according to the reclaimer application.

In other words, this last turning angle (θn) is nothing more than the last angle where a desired reclaiming rate was obtained before reaching the reversal angle.

The five steps mentioned above are performed during the procedure of memorizing important information during the turning movement of boom 1. Recorded information about the correlations (Co) between the boom turning speed (Vg) and the mass flow rate Vz) and events of overflows are used in the next turning movement of boom 1 in the same direction of rotation as the one obtained.

Information about the last considered flow rate (Vzc) angle (θn) and turning speed (Vg) corresponding to this angle is used in the next turning movement of the boom 1 in the opposite direction to that obtained, that is, right after the reverse movement command.

The steps involved in the procedure for using this recorded information are explained below, demonstrating how it is used to assist the reclaiming flow controller.

The sixth step consists of the initialization of reclaiming after the turning reverse movement, that is, in the direction opposite to the previous movement. Reclaiming is initialized with an initial boom turning speed.

This initial turning speed may be equal to the final turning speed, that is, the turning speed that was being used before the reverse movement, provided that the machine translation system 3 has values with the same behavior in both directions.

The seventh step consists in monitoring the value of the last turning angle (θn) previously recorded in the fifth step. When the turning angle is at a given value of degrees of the last turning angle (θn), the current turning speed (Vg) must be equal to or less than the average turning speed (Vgm) corresponding to the last turning angle (θn).

This determined value of degrees in relation to the last turning angle (θn) is parameterized according to the application. This step aims at performing a preliminary control of the turning speed (Vg) during certain angular positions (θ) of boom 1.

The eighth step consists in verifying the turning angles in the previous movement of boom 1 where events of overflow were identified. With information on these angles, the reclaiming flow controller is able to predict events of overflow and decrease the boom turning speed (Vg).

This decrease in the boom turning speed (Vg) causes the reclaiming rate to be reduced at that particular angle, thus avoiding overflow in this region where an event of overflow was already identified in the previous movement.

In the ninth step, a calculation is made to determine an ideal boom turning speed (Vgi) during the current turning movement, that is, during the movement being performed.

The average mass flow rates (Vzm), previously calculated in the second step of the method for each corresponding angle, are used to perform calculation.

At each angular range, that is, at each recorded turning angle, the average flow rate (Vzm) values recorded in the previous turning movement are compared with the desired setpoint. If the recorded average flow rate (Vzm) value is within a desired range, that is, within a preset percentage of the setpoint, the average turning speed (Vgm) recorded for that angle is maintained.

This means that if the average flow rate (Vzm) recorded in the previous turning movement at that particular angular position (θ) is within a desired reclaiming rate range, the recorded average turning speed (Vgm) is equal to the ideal turning speed (Vgi) for that particular angle.

If the recorded average flow rate (Vzm) value is greater than the desired value, that is, it is above the preset percentage of the setpoint, the actual boom turning speed (Vg) must be less than the average value of the boom turning speed (Vgm) stored in the previous turning movement.

This means that if the average flow rate (Vzm) recorded in the previous turning movement at that particular angular position (θ) is above a desired reclaiming rate range, the recorded average turning speed (Vgm) is greater than the ideal turning speed (Vgi) for that particular angle.

In this case, the ideal turning speed (Vgi) is used by the flow controller and is less than the recorded average turning speed (Vgm) to avoid another event of overflow, that is, a mass flow rate (Vz) above the capacity of the machine.

The tenth step consists in verifying the possibility of applying the ideal turning speed (Vgi) calculated in the previous step. This verification is performed by means of the values of correlations (Co) recorded in the previous movement of boom 1.

Thus, the value of correlations (Co) in the angular position (θ) of the previous turning movement is verified, comparing it with the correlation (Co) of the current turning angle. If these correlations (Co), that is, in the previous turning angle and current turning angle have a close value, the turning speed (Vg) of the boom being used is verified.

This verification consists of comparing the current turning speed (Vg) and the ideal turning speed (Vgi). If they also have a close value, the current boom turning speed (Vg) is maintained, otherwise the material reclaiming rate is verified.

This verification of reclaiming rate also consists of verifying the average mass flow rate (Vzm) recorded for that particular angle. If the recorded average mass flow rate (Vzm) is at a satisfactory rate, the current boom turning speed (Vg) is maintained, otherwise the ideal turning speed (Vgi) is implemented.

Thus, using the reclaimer control system and method, the flow controller verifies all reclaiming rates for all angles present in the angular movement of boom 1 of the reclaimer, thereby determining the ideal turning speed (Vgi) for each moment and each angular position (θ) of boom 1).

In addition, the controller performs such changes in the boom turning speed (Vg) in real time, taking into account all delay times arising from the position of the scale on boom 1 and the acceleration ramp, and not using robust 2D sensors to predict bench irregularities.

Nevertheless, real-time changes in the boom turning speed (Vg) are able to maintain high productivity of reclaimer 13, in addition to preventing events of overflow in the machine, ensuring efficiency and safety of this equipment.

The invention claimed is:

1. A control system for a reclaimer having a boom, a bucket wheel, and a translation system, comprising:
   a flow controller configured to:
      record operating parameters of a first movement of the boom, including being configured to record a mass flow rate (Vz) and a boom rotating speed (Vg) related to a plurality of angular positions (θ) of the boom; and
      use the recorded operating parameters to adjust the operating parameters of a second movement of the boom.

2. The control system for the reclaimer according to claim 1, wherein the flow controller is configured to average values of the mass flow rate (Vz) and the boom rotating speed (Vg) between the angular positions (θ) of the boom, and to calculate an average mass flow rate (Vzm) and an average rotating speed (Vgm) of the boom.

3. The control system for the reclaimer according to claim 1, wherein the flow controller is configured to perform a correlation (Co) between the average mass flow rate (Vzm) and the average rotating speed (Vgm), wherein the correlation (Co) comprises a ratio between the average rotating speed (Vgm) of the boom and the average mass flow rate (Vzm).

4. The control system for the reclaimer according to claim 1, wherein the flow controller is configured to adjust the boom rotating speed (Vg) during a turning movement of the boom.

5. The control system for the reclaimer according to claim 4, wherein the flow controller is configured to maintain a reclaiming flow at a satisfactory rate and below a maximum load of the reclaimer.

6. The control system for the reclaimer according to claim 1, wherein the flow controller is configured to account for time delays caused by a distance of a scale in the boom and by acceleration and deceleration ramps for actuation of turning mechanism inverters of the reclaimer.

7. A method for controlling a reclaimer having a boom, comprising:
   sampling, for a given time, variables including: mass flow rate (Vz); boom rotating speed (Vg); and angular positions (θ) of the boom;
   averaging values of the boom rotating speed (Vg) and the mass flow rate (Vz) at the angular positions (θ) of the boom;
   calculating a correlation (Co) between the values of the average boom rotating speed (Vgm) and the average mass flow rate (Vzm) for the angular positions (θ) of the boom;
   recording the angular positions (θ) of the boom in an overflow event, if any;
   recording a last angular position (θn) and the rotating speed (Vg) of the boom in which a considered mass flow rate (Vzc) is obtained before reverting the a turning movement of the boom;
   initializing movement of the boom after the turning movement in the opposite direction;
   monitoring the boom rotating speed (Vg) based on a value recorded at the last angular position (θn) in which a considered mass flow rate (Vzc) was obtained;
   verifying the angular positions (θ) in the turning movement of the boom where an overflow event was identified;
   calculating an ideal boom rotating speed (Vgi) during the movement of the boom in the opposite direction; and
   verifying a possibility of applying the ideal boom rotating speed (Vgi).

8. The method according to claim 7, wherein the last angular position ($\theta n$) in which the considered mass flow rate (Vzc) is obtained in the recording comprises the last angular position ($\theta n$) where a satisfactory reclaiming flow was obtained.

9. The method according to claim 7, wherein the monitoring of the boom rotating speed (Vg), based on the value recorded in the last angular position ($\theta n$) in which the considered mass flow rate (Vzc) was obtained, maintains the boom rotating speed (Vg) below or similar to the average boom rotating speed (Vgm), thereby maintaining a satisfactory reclaiming flow and avoiding overflow.

10. The method according to claim 7, wherein the verifying of the angular positions ($\theta$) where an overflow event was identified allows the flow controller to decrease the boom rotating speed (Vg) when passing through a particular angular position ($\theta$) to avoid overflow.

11. The method according to claim 7, wherein the calculating of the ideal boom rotating speed (Vgi) is performed based on the average boom rotating speed (Vgm) and the average mass flow rate (Vzm) of the angular positions ($\theta$).

12. The method according to claim 7, wherein the verifying of the possibility of applying the ideal boom rotating speed (Vgi) is performed based on the correlation (Co), verifying if a first correlation is close to a second correlation recorded at a same angular position ($\theta$).

\* \* \* \* \*